(12) United States Patent
Sridharan et al.

(10) Patent No.: US 6,982,864 B1
(45) Date of Patent: Jan. 3, 2006

(54) COPPER TERMINATION INKS CONTAINING LEAD FREE AND CADMIUM FREE GLASSES FOR CAPACITORS

(75) Inventors: Srinivasan Sridharan, Strongsville, OH (US); Umesh Kumar, Carlsbad, OH (US); Chandrashekhar S. Khadilkar, Broadview Heights, OH (US)

(73) Assignee: Ferro Corporation, Cleveland, OH (US)

( * ) Notice: Subject to any disclaimer, the term of this patent is extended or adjusted under 35 U.S.C. 154(b) by 25 days.

(21) Appl. No.: 10/864,309

(22) Filed: Jun. 9, 2004

(51) Int. Cl.
*H01G 4/06* (2006.01)

(52) U.S. Cl. .................. 361/321.1; 361/321.5; 361/311; 361/313; 361/306.1; 501/138; 501/139

(58) Field of Classification Search ........... 361/321.1, 361/321.2, 321.5, 301.3, 306.1, 306.3, 311, 361/313, 320, 328, 301.4; 510/138, 139
See application file for complete search history.

(56) References Cited

U.S. PATENT DOCUMENTS

| | | |
|---|---|---|
| 3,615,772 A | 10/1971 | Kohut |
| 4,152,282 A | 5/1979 | Baudry et al. |
| 4,220,547 A | 9/1980 | Abe et al. |
| 4,323,652 A | 4/1982 | Baudry et al. |
| 4,379,319 A | 4/1983 | Wilson |
| 4,517,155 A | 5/1985 | Prakash et al. |
| 4,880,567 A | 11/1989 | Prabhu et al. |
| 4,906,406 A | 3/1990 | Hormadaly |
| 5,051,381 A | 9/1991 | Ohji et al. |
| 5,165,986 A | 11/1992 | Gardner et al. |
| 5,296,426 A | 3/1994 | Burn |
| 5,439,852 A | 8/1995 | Hormadaly |
| 5,468,695 A | 11/1995 | Carroll et al. |
| 5,491,118 A | 2/1996 | Hormadaly |
| 5,753,571 A | 2/1998 | Donohue |
| 5,805,409 A * | 9/1998 | Takahara et al. ............ 361/303 |
| 5,948,536 A | 9/1999 | Suzuki et al. |
| 6,105,394 A | 8/2000 | Sridharan et al. |
| 6,124,224 A | 9/2000 | Sridharan et al. |
| 6,171,987 B1 | 1/2001 | Hormadaly |
| 6,185,087 B1 | 2/2001 | Park et al. |
| 6,556,422 B2 * | 4/2003 | Kim et al. ................ 361/321.2 |
| 6,572,793 B2 * | 6/2003 | Fukui et al. ............. 252/520.2 |
| 6,649,554 B1 * | 11/2003 | Chang et al. ................ 501/137 |
| 6,673,274 B2 | 1/2004 | Venigalla et al. |

* cited by examiner

*Primary Examiner*—Dean A. Reichard
*Assistant Examiner*—Nguyen T. Ha
(74) *Attorney, Agent, or Firm*—Rankin, Hill, Porter & Clark LLP

(57) ABSTRACT

Lead-free and cadmium-free glass composition that is particularly suitable for use in conductive ink applications. The invention includes a capacitor comprising a copper termination, the copper termination is made by firing an ink including a glass component, the glass component may comprise up to about 65 mole % ZnO, up to about 51 mole % SrO, about 0.1 to about 61 mole % $B_2O_3$, up to about 17 mole % $Al_2O_3$, about 0.1 to about 63 mole % $SiO_2$, up to about 40 mole % BaO+CaO, and up to about 20 mole % MgO.

22 Claims, 1 Drawing Sheet

US 6,982,864 B1

COPPER TERMINATION INKS CONTAINING LEAD FREE AND CADMIUM FREE GLASSES FOR CAPACITORS

FIELD OF THE INVENTION

The present invention relates to lead-free and cadmium-free copper termination inks containing reduction resistant lead-free and cadmium-free glasses for use in producing electronic capacitors.

BACKGROUND OF THE INVENTION

Capacitors are electrical components that have the capability of storing electrical energy. This energy is stored in an electrostatic field that is created by electrical charges accumulating on conducting plates placed across an electrical potential and separated by an insulating medium such as ceramics, for example barium titanate ($BaTiO_3$), magnesium titanate ($MgTiO_3$). These ceramic capacitors are used in various applications such as in temperature compensation, in semiconductors, and in applications requiring various dielectric constants, for example Low K class I ceramics and Higher K class II ceramics.

A conventional structure for ceramic capacitors is a structure of multiple layers in which dielectric layers of ceramic are interleaved with conductive electrodes. Alternating conductive electrodes are electrically connected, resulting in a device having two effective electrodes with a capacitance many times the capacitance of the single dielectric layer, packed in a relatively very small volume. These multilayer ceramic capacitors (MLCCs) are the most reliable component for high energy density storage banks. This type of capacitor has been developed to meet demands for high-density ceramic capacitors.

MLCCs consist of a plurality of interleaved and staggered layers of an electrically conductive film of metal known as electrodes, formed by the deposition (usually by screen printing or the like) of a thick film paste or ink, and electrically insulating layers of a dielectric ceramic oxide, formed by laying a cast dielectric tape or by casting a dielectric slurry over the dried electrode. Such capacitors are well known in the art. U.S. Pat. No. 2,389,420, for example, describes the structure, manufacture and properties of monolithic multilayer ceramic capacitors formed using cast dielectric green (unfired) tape.

In a typical MLCC the end termination provides the vital electrical path between the inner electrodes and components exterior to the capacitor. A typical end termination is made by post firing an end termination ink on a pre fired MLCC structure. A typical end termination ink comprises metal particles and glass particles dispersed in an organic medium. Despite its relatively small proportion in an end termination ink, glass plays a major role in providing adhesion to the capacitor body, providing thermal expansion matching between the end termination and the capacitor body to avoid cracking at the interface, ensuring good metal densification, allowing a wider firing window, and preventing penetration of plating solution into the termination during subsequent processing.

Multi-layered ceramic capacitors incorporate multiple printed layers of electrode plates and ceramic sheets. These capacitors are more compact and have better temperature characteristics than single-layered ceramic capacitors. Air fired conventional multi-layered ceramic capacitors are, however, rather expensive because their electrode plates use precious metals, such as silver, gold, platinum, palladium and alloys thereof. Therefore MLCCs with base metal electrodes have been developed. However these have to be fired in atmospheres containing very little $O_2$, such as $N_2$ atmosphere with less than 10 ppm oxygen. Development of novel reduction resistant end termination inks in general, reduction resistant Pb free and Cd free glasses for use in termination ink in particular, is the subject of this present invention.

SUMMARY OF THE INVENTION

The present invention provides a lead-free and cadmium-free copper containing termination ink for use in producing a multilayer capacitor. The ink includes a glass component. The glass component contains at least one glass frit. At least one of the glass frits is partially crystallizing to maintain a high viscosity to prevent a defect called glassing which will interfere with proper solder wetting and adhesion. In general, the present invention comprises a termination ink having a metal component and a glass component. The metal component comprises copper. The glass component comprises up to about 65 mole % ZnO, up to about 51 mole % SrO, about 0.1 to about 61 mole % $B_2O_3$, up to about 17 mole % $Al_2O_3$, about 0.1 to about 63 mole % $SiO_2$, up to about 40 mole % BaO+CaO, up to about 20 mole % MgO, and the molar ratio of $B_2O_3$ to $SiO_2$ is from about 0.7 to about 5. The copper termination ink for dipping will have a viscosity of about 15,000 to about 35,000 centipoise, when measured using Brookfield HAT type SC4 14/5R viscometer and spindle assembly.

New conductive materials, including termination inks, are continually being sought in the MLCC industry which provide improved adhesion to substrates, improved chemical resistance to plating solutions, a wider processing window, and better metal sintering. The termination inks of the present invention provide such desired characteristics. The invention further provides a novel capacitor made using the inventive termination ink and a method of fusing such end termination inks.

The copper termination inks of the present invention upon firing exhibit superior adhesion to $BaTiO_3$ and display good compatibility with base metal electrodes. The foregoing and other features of the invention are hereinafter more fully described and particularly pointed out in the claims, the following description setting forth in detail certain illustrative embodiments of the invention, these being indicative, however, of but a few of the various ways in which the principles of the present invention may be employed.

DETAILED DESCRIPTION OF THE INVENTION

Figure 1:
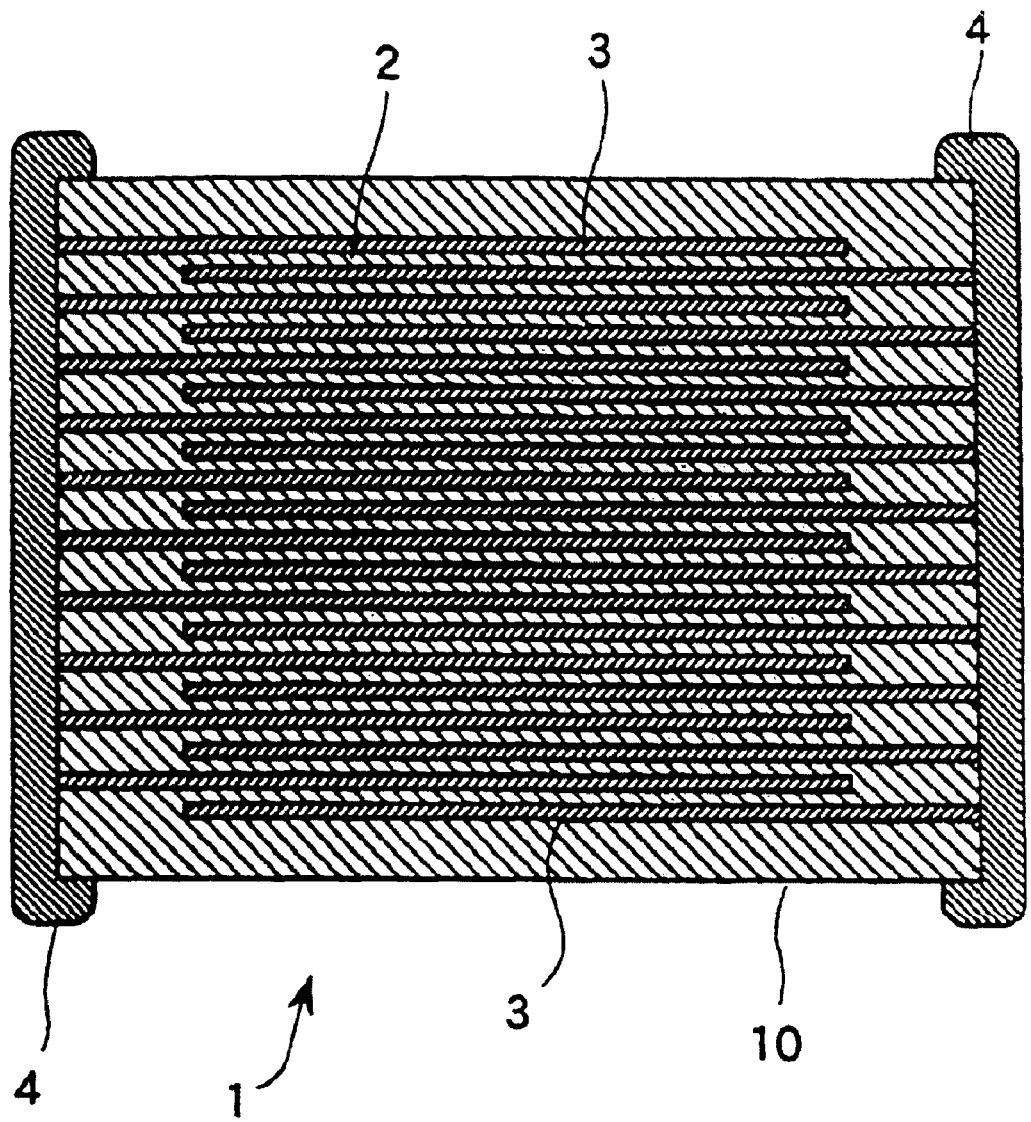
FIG. 1 is an elevational cross-sectional view of a multilayer ceramic chip capacitor according to the invention.

The present invention provides a termination ink comprising a metal component, a glass component and a binder component. The invention further provides a capacitor made using the termination ink disclosed herein.

In the description and accompanying claims, all compositional percentages relating to the glass component are in mole %, and ratios are molar ratios. A statement that a composition contains, for example, "about 15 to about 35 mole % BaO+CaO" means that with respect only to the BaO and CaO in the composition, the combined total of BaO and CaO is about 15 to about 35 mole % of the total composition on a molar basis. For example, 10 mole % CaO and 25 mole % BaO. All compositional percentages relating to the composition of the termination ink are in weight percent (wt %).

The glass component of the present invention is lead-free and cadmium-free. As used throughout the instant specification and the appended claims, the phrases "lead-free" and "cadmium-free" mean that no lead, PbO, or lead-containing glasses, cadmium, CdO, or cadmium containing glasses have been intentionally added to the composition. While trace elements could be present from contaminants of raw materials, with respect to the overall inorganic portion of the ink, the content of Pb will be less than 200 ppm and similarly, the Cd content will be less than 200 ppm. The glass frit or frits of the present invention may include ZnO, SrO, $SiO_2$, $B_2O_3$ $Bi_2O_3$, $Al_2O_3$, BaO, CaO, MgO, CuO, $SnO_2$, $CeO_2$, $MnO_2$, $CO_3O_4$ as well as alkali oxides such as $Li_2O$, $Na_2O$, $K_2O$, $Rb_2O$, $Cs_{2O}$ and $Fr_2O$. It is possible and sometimes desirable to practice the invention wherein the glass component excludes alkali oxides.

It will be appreciated that the glass component according to the invention can comprise one glass frit, or it can comprise a mixture of several glass frits, including non-crystallizing glass frits, or a mixture of glass frits and inorganic oxides such as $SiO_2$, ZnO, $B_2O_3$, $CO_3O_4$, and others, so as to provide the desired glass composition. The glass frit or frits of the glass component may be prepared utilizing conventional glass melting techniques. A conventional ceramic refractory, fused silica, or platinum crucible may be used to prepare the glass frit. Typically, a mixture of selected raw materials designed to give the desired glass composition are smelted at temperatures of from about 1000° C. to about 1550° C. for about 60 minutes. The molten glass formed in the crucible is then converted to glass flakes or cullets using water-cooled steel rollers or quenching in a tank of water. Pouring onto cold steel rolls results in thin flakes suitable for milling. These flakes or cullets are then milled to a suitable particle size distribution (e.g., average particle size of about 1 to about 6 microns). It will be appreciated that a coarser particle size of 40–50 microns can be used in dip coating and spraying applications. It will be further appreciated that the production the glass frit is not per se critical and any of the various techniques well known to those skilled in the art can be employed.

In general the termination inks are applied and fired on a prefired MLCC pieces (i.e., used on a post fired basis). Typical firing temperatures of the inventive inks and glasses are from about 750° C. to about 900° C., preferably from about 780° C. to about 850° C., and more preferably from about 800° C. to about 830° C.

The metal component comprises copper metal. Copper metal typically is provided in the form of at least one powder or flake. Copper powders may have particle sizes ranging from about 0.1 micron to about 40 microns. In particular, more than one size range of copper particles may be used. For example, a first, finer, copper powder may have a size distribution of d10=0.1–0.3 microns, d50=0.6–1.1 microns and d90=1.5–3.5 microns. A second, coarser, copper powder may have a size distribution range of d10=2–5 microns; d50=3–8 microns; and d90=15–25 microns. Commercially available copper powders suitable herein include Cu 10K-1 and Cu8ED from the Ferro Corporation of Cleveland, Ohio, and Cu 1050Y and Cu MA-CF-E from the Mitsui Mining and Smelting Co, Ltd, of Tokyo, Japan. It will be appreciated that sinter aids such as cobalt may be included with the metal component.

The organic binder is usually an organic resin mixed with a suitable vehicle. The vehicle generally includes one or more solvents. The vehicle preferably comprises a solvent and a resin. Optionally, the vehicle may also comprise a thixotrope and a wetting agent in order to facilitate the application of the ink to the capacitor. Any essentially inert binder can be used in the practice of the present invention, including various organic liquids, with or without thickening and/or stabilizing agents and/or other common additives. Exemplary of the organic liquids which can be used are the aliphatic alcohols, esters of such alcohols, for example, the acetates and propionates. Terpenes also may be used, such as pine oil, alpha terpineol, and beta terpineol. Suitable terpenes include those available from Hercules Corporation under the Terpineol® trademark, including for example Terpineol® Prime 318. Also suitable are solutions of acrylic resins such as the polymethacrylates of lower alcohols, or solutions of ethyl cellulose in solvents such as pine oil, the monobutyl either of ethylene glycol monoacetate, and carbinol kerosene, dibutyl phthalate, hexylene glycol, 2,4,4-trimethyl-1,3-pentanediol monoisobutylrate, N-methyl-2-pyrrolidone, ethyl hydroxyethyl cellulose, wood rosin, mixtures of ethyl cellulose and phenolic resins, and the monobutyl ether of ethylene glycol monoacetate or mixtures thereof. Additionally, solvents sold under the Dowanol® or Carbitol®) trademarks, commercially available from the Dow Chemical Company, Midland Mich., may be used. Such Dowanol® solvents suitable in the practice of the present invention include propylene glycol, methyl ether, dipropylene glycol methyl ether, tripropylene glycol methyl ether, propylene glycol methyl ether acetate, dipropylene glycol methyl ether acetate, propylene glycol n-propyl ether, dipropylene glycol n-propyl ether, and the like. Suitable solvents sold under the Carbitol® trademark include butyl carbitol (diethylene glycol monobutyl ether), butyl carbitol acetate (diethylene glycol monobutyl ether acetate) and the like. Various combinations of these and other solvents may be formulated to obtain the desired viscosity and volatility requirements for each application.

Examples of potential suitable thixotropic agents include organic based thixotropes such as, for example, ethyl cellulose, hydrogenated castor oil, silicates and derivatives thereof.

Examples of potential suitable wetting agents (i.e., surfactants) include fatty acid esters, for example, N-tallow-1,3-diaminopropane di-oleate, N-tallow trimethylene diamine diacetate, N-coco trimethylene diamine, beta diamines, N-oleyl trimethylene diamine, N-tallow trimethylene diamine, and/or N-tallow trimethylene diamine di-oleate.

The glass compositions of the present invention provide superior adhesion to common capacitor substrates, including $BaTiO_3$, as well as good copper densification. Applicants also believe that the inks of the present invention may be used with other capacitor substrates, such as those made with $Nd_2Ti_2O_7$ and $MgTiO_3$. Further, they allow a wider firing window with no blistering or glassing effect. It is believed that the presence of ZnO promotes adhesion of the termination ink to $BaTiO_3$ substrates due to the formation of zinc titanates at the interface. The ratio of $B_2O_3$ to $SiO_2$ is believed to play a role in copper densification, with a ratio over 0.7 and preferably over 1.0 providing adequate or superior copper densification. Desirable properties of a termination include a wide processing window (firing temperatures), good adhesion to $BaTiO_3$ (and other typical dielectric components), good chemical resistance to plating solutions, as well as good solder wetting, as well as good copper densification. As is known in the art, a termination is sometimes known as an external electrode.

A method of providing good adhesion at the interface includes reactive bonding. In reactive bonding fluid glass spreads on and reacts with a $BaTiO_3$ substrate, forming thermodynamically stable crystals at the interface. These crystals can be, for example, titanates, silicates, or aluminates. Reactions between the substrate and the crystals to form such beneficial reactive phases are believed to lead to an overall lowering of the total free energy of the system, which can lead to increased adhesion. Of course, mechanical interlocking between termination glass and substrate may also be involved.

In addition to the glass component, the metal component, and the binder, various conventional fillers or expansion modifiers may be included in the ink. Examples of such fillers or expansion modifiers include zinc silicates, magnesium silicates, barium silicates, calcium silicates, barium aluminum silicates, zirconium silicates, barium magnesium silicates, zirconia, alumina, silica, titania and mixtures of the foregoing.

In order to produce a termination ink, the copper powder (one or more) and the glass component (one or more glass frits and/or crystalline additives), together with a binder, solvent, and wetting agent, are batched and homogenized in a mixer. In general, a Hobart mixer is used. After homogenization, the ink is milled in a 3-roll mill. After multiple passes, the homogeneity of the ink will be tested by a Fineness of Grind measurement (FOG measurement).

A first embodiment of the present invention is an ink including a glass component, the glass component comprising up to about 65 mole % ZnO, up to about 51 mole % SrO, about 0.1 to about 61 mole % $B_2O_3$, up to about 17 mole % $Al_2O_3$, about 0.1 to about 63 mole % $SiO_2$, up to about 40 mole % BaO+CaO, up to about 20 mole % MgO, and the molar ratio of $B_2O_3$ to $SiO_2$ is from about 0.7 to about 5.

Variations of this embodiment of the inventive glass component may include a ZnO content from about 10 to about 60 mole %. The total of $B_2O_3$ and $SiO_2$ of the glass component may be about 5 to about 60 mole %. In another variation, the ratio of $B_2O_3$ to $SiO_2$ is about 0.7 to about 3.0. In another variation, the glass component excludes alkali oxides such as $Li_2O$, $Na_2O$, $K_2O$, $Rb_2O$, $Cs_2O$ and $Fr_2O$.

In another embodiment of the invention the glass component comprises from about 20 to about 60 mole % ZnO, up to about 49 mole % SrO, from about 0.1 to about 61 mole % $B_2O_3$, from about 0.1 to about 17 mole % $Al_2O_3$, from about 0.1 to about 63 mole % $SiO_2$, from about 0.1 to about 40 mole % BaO+CaO, and up to about 20 mole % MgO, wherein the ratio of $B_2O_3$ to $SiO_2$ is from about 0.7 to about 3. Variations of this embodiment of the glass component may have a total content of $B_2O_3$ and $SiO_2$ from about 5 to about 60 mole % of the glass component. Another variation may have a total content of BaO and CaO of from about 25 to about 35 mole %. Yet another variation of this embodiment may further comprise from about 0.1 to about 30 mole % CuO. The MgO content may be instead about 5 to about 15 mole %. In another variation, the glass component may contain any of $Li_2O$, $Na_2O$, $K_2O$, $Rb_2O$, $Cs_2O$ and $Fr_2O$ or any combination thereof in an amount from about 2% to about 15 mole % of the composition.

Another embodiment of the present invention provides a glass component comprising: about 0.1 to about 65 mole % ZnO, about 0.1 to about 51 mole % SrO, about 0.1 to about 61 mole % $B_2O_3$, about 0.1 to about 17 mole % $Al_2O_3$, about 0.1 to about 63 mole % $SiO_2$, about 0.1 to about 40 mole % BaO+CaO, and about 0.1 to about 20 mole % MgO. The molar ratio of $B_2O_3$ to $SiO_2$ may be from about 0.7 to about 5, and the termination ink in a green, unfired state, may have viscosity of about 15,000 to 35,000 centipoise when measured using Brookfield HAT type SC4 14/5R viscometer and spindle assembly. Preferably this viscosity is about 20,000 to about 30,000 centipoise. More preferably, this viscosity is about 22,000 centipoise to about 28,000 centipoise.

The ZnO content of this embodiment may be instead from about 10 to about 56 mole % or from about 40 to about 60 mole %. The SrO content of the glass component may instead be from about 0.1% to about 49 mole %, or from about 20 to about 45 mole %. The SrO content may also be zero. The $B_2O_3$ content of the glass component may be instead from about 15 to about 35 mole %, or from about 20 to about 30 mole %. A further possible limitation on amounts of $B_2O_3$ and $SiO_2$ in this embodiment may be that the total of $B_2O_3+SiO_2$ is from about 30% to about 60 mole %. The $Al_2O_3$ content of this embodiment may instead be about 0.1 to about 15 mole %, from about 0.2 to about 5 mole %, or from about 0.3% to about 1 mole %. The total of CaO and BaO taken together in this embodiment may instead be about 0.1 to about 35 mole %, or from about 25 to about 35 mole %. The MgO content of this embodiment may instead be about 0.1% or 1% to about 15 mole %, or from about 5 to about 11 mole %. This embodiment may further comprise CuO, up to 30 mole %, or from about 0.1 to about 25 mole %.

The molar ratio of $B_2O_3$ to $SiO_2$ in this embodiment may be from about 0.7 to about 3, from about 0.7 to about 2, from about 1 to about 3, or from about 1.3 to about 1.8.

Another embodiment is an ink including a glass component, the glass component comprising about 0.1 to about 51 mole % SrO, about 0.1 to about 61 mole % $B_2O_3$, about 0.1 to about 63 mole % $SiO_2$, about 0.1 to about 17 mole % $Al_2O_3$, and about 0.1 to about 20 mole % CuO. The glass component may also include about 20 to about 40 mole % SrO, about 10 to about 30 mole % $B_2O_3$, about 10 to about 25 mole % $SiO_2$, about 7 to about 17 mole % $Al_2O_3$ about 10 to about 25 mole % CuO, wherein the molar ratio of $B_2O_3$ to $SiO_2$ is about 0.7 to about 2.

Yet another embodiment is an ink including a glass component, the glass component comprising about 0.1 to about 20 mole % $CO_3O_4+MnO_2$, about 0.1 to about 49 mole % SrO, about 0.1 to about 61 mole % $B_2O_3$, about 0.1 to about 17 mole % $La_2O_3+Y_2O_3+Ga_2O3$, about 0.1 to about 63 mole % $SiO_2$, about 0.1 to about 40 mole % BaO+CaO, up to about 20 mole % MgO. The molar ratio of $B_2O_3$ to $SiO_2$ is from about 0.7 to about 5, and the ink has a viscosity of about 15,000 to about 35,000 centipoise.

Where two glasses are used, the primary glass is used for adhesion without glassing, and the second glass is used to improve the durability and/or thermal expansion matching of the glass component, and such second glass preferably has a low content of zinc, or preferably no zinc at all. An ink composition of the present invention includes one or more copper powders, at least one glass frit, a binder, organic additives and a solvent. The ink comprises about 55–85 wt % of the copper powder, about 1–22 wt % of one or more glass frits, about 1–10 wt % of a binder, about 0.1 to 3% of additives and about 5 to 25 wt % of a solvent. Preferably, the ink comprises from about 70 to about 80 wt % of the one or more copper powders, from about 2 to about 15 wt % of one or more glass frits, from about 2 to about 6 wt % of a binder, from about 0.5 to about 2 wt % of additives, and from about 5 to about 20 wt % of a solvent.

A further embodiment of the present invention is a capacitor, to include multilayer ceramic capacitors (MLCCs), including terminations made incorporating the inventive termination inks as discussed hereinabove. Also envisioned within the practice of the present invention is a method of making multilayer ceramic chip capacitor having end terminations comprising: forming a green chip by stacking alternating layers of a dielectric material and a conductive electrode material, firing the green chip to form a multilayer ceramic chip capacitor, dipping the terminations of the capacitor in a conductive paste comprising copper and an ink including a glass component, post-firing the chip to sinter the end terminations. Any glass component disclosed herein may be used in the method of making a multilayer chip capacitor.

The configuration of multilayer ceramic capacitors is well known in the art. With reference to FIG. 1, an exemplary structure of a multilayer ceramic chip capacitors 1 is shown. End terminations 4 of the capacitor 1 are disposed on side surfaces of the capacitor chip 10 and in electrical connection with internal electrode layers 3. The capacitor chip 10 has a plurality of alternately stacked dielectric layers 2. The shape of the capacitor chip 10 is not critical although it is often rectangular shaped. Also, the size is not critical and the chip may have appropriate dimensions in accordance with a particular application, typically in the range of 1.0 to 7.0 mm×0.5 to 5.0 mm×0.5 to 2.0 mm. The internal electrode layers 3 are stacked such that at opposite ends they are alternately exposed at opposite side surfaces of the chip 10. That is, the internal electrode layers 3 of one group are exposed at one side surface of the chip 10 and the internal electrode layers 3 of another group are exposed at the opposite side surface of the chip 10. One end termination 4 is applied to one side chip of the capacitor chip 10 in electrical contact with the internal electrode layers 3 of the one group, and the other end termination 4 is applied to the opposite side surface of the chip 10 in electrical contact with the internal electrode layers 3 of the other group. The dielectric layers are formed of one or more dielectric materials which may contain barium titanate ($BaTiO_3$) and other oxides such as neodymium titanate ($Nd_2Ti_2O_7$) and magnesium titanate ($MgTiO_3$) as major components, while manganese oxide, yttrium oxide, holmium oxide, calcium carbonate, silicon oxide, boron oxide, aluminum oxide, magnesium oxide, and calcium oxide may be present as minor components. Other compounds may be contained in the dielectric material provided that the other compound does not adversely affect dielectric properties.

Each dielectric layer preferably has a thickness of up to about 50 μm, more preferably up to about 20 μm. The lower limit of thickness is about 0.5 μm, preferably about 2 μm. The present invention is effectively applicable to multilayer ceramic chip capacitors having such thin dielectric layers for minimizing a change of their capacitance with time. The number of dielectric layers stacked is generally from about 2 to about 600, although embodiments having more than 600 layers are possible.

The conductor that forms the internal electrode layers 3 is not critical, although a base metal preferably is used since the dielectric material of the dielectric layers 2 has anti-reducing properties. Typical base metals are nickel and nickel alloys. The thickness of the internal electrode layers may be suitably determined in accordance with a particular purpose and application although its upper limit is typically about 5 μm, and more preferably about 2.5 μm, and its lower limit is typically about 0.5 μm, and more preferably about 1 μm.

An ink or slurry for forming the dielectric layers can be obtained by mixing a raw dielectric material with an organic vehicle. The raw dielectric material may be a mixture of oxides and composite oxides. The organic vehicle is a binder in an organic solvent. The binder used herein is not critical and may be suitably selected from conventional binders such as those disclosed hereinabove with reference to the inks of the present invention.

Terminations 4 are formed by applying the inventive termination ink across the ends of a prefired MLCC. The termination ink may be applied by dipping or brushing, as known in the art. The thickness of the termination may be suitably determined in accordance with a particular purpose and application although it generally ranges from about 1 μm to about 100 μm. Certain applications require the termination thickness to be about 10 μm to about 50 μm, or from about 20 μm to about 40 μm.

The multilayer ceramic chip capacitor of the present invention generally is fabricated by forming a green chip by conventional tape casting, printing and sheeting methods using slurries or pastes, firing the chip, and printing or transferring terminations thereto followed by a second firing. The termination inks are typically fired at temperatures lower than the initial firing to sinter the capacitor as a whole. The initial firing of the capacitor body generally occurs at a temperature of from about 750° to about 1350° C., and the firing of the body with the ink applied generally occurs at a temperature of from about 650° to about 900° C. Further details on the manufacturing procedures used to make a MLCC may be found in U.S. Pat. No. 6,185,087 to Park et al. the disclosure of which is hereby incorporated by reference.

The following examples are intended only to illustrate the invention and should not be construed as imposing limitations upon the claims.

EXAMPLES

Glass frits A through H having the following compositions by mole percent, were each prepared using conventional glass melting techniques. The compositions of the glasses made are found in table 1. The glass transition temperature (Tg), coefficient of thermal expansion (CTE), and compositional ratios (mole $B_2O_3$/mole $SiO_2$) are found in Table 2.

Termination inks AA through HH having the compositions as listed in Table 3 were prepared by standard ink preparaton procedures. The inks have a viscosity of about 15,000 centipoise to about 35,000 centipoise. The copper powders used herein are commercially available from the Ferro Corporation. Copper powder Cu I has a D50 particle size of about 0.8 micron, Copper powder Cu II has a D50 particle size of about 4 to 6 microns, and Copper powder Cu III is a flaked powder having a D50 particle size of about 4 to 6 microns. $BaTiO_3$ capacitors of case size 1206 were terminated with these pastes and fired at different firing temperatures.

The optimum firing range (i.e., processing window) for each termination ink was determined based on having acceptable properties for copper densification, nickel engross depth, adhesion, and no glassing. After firing a capacitor, the end termination is plated with nickel. In order to find the amount of Ni engross the capacitor is mounted in a cross section and polished. The depth of nickel engross is measured and should not exceed 10% of the thickness of the end termination. Further, on a 1206 capacitor, the peel strength of the end termination must be greater than 1.5 pounds. With respect to glassing, no glass beads or blistering should appear. The optimum firing temperature is taken as that temperature which is 10° C. below the temperature at which glass beads or blisters (glassing defects) are evident. If glassing is evident at 820° C. and not 810° C., then 810° C. is the upper limit of the processing window. The lower limit of this window is that temperature which is 10° C. above the minimum temperature at which sufficient copper densification, as measured by cross sectional microscopy and adhesion, as measured by a peel strength of at least 1.5 pounds, is achieved. Copper densification should be at least about 90% or above. The nickel engross should also be no greater than 10% at the lower temperature limit. The optimum firing temperatures thus obtained are listed in Table 3, which indicates a firing window of about 10° C. to about 30° C. for the inventive copper termination inks.

TABLE 1

Representative lead-free and cadmium-free glasses for copper termination inks

Constituent (Mole Percent)

| Glass | SrO | ZnO | $B_2O_3$ | $SiO_2$ | MgO | $Al_2O_3$ | BaO | CuO |
|---|---|---|---|---|---|---|---|---|
| A | 0 | 59.1 | 25.9 | 15.0 | 0 | 0 | 0 | 0 |
| B | 0 | 56.0 | 21.7 | 13.2 | 9.3 | 0.2 | 0 | 0 |
| C | 0 | 20.0 | 30.0 | 20.0 | 0 | 0 | 30.0 | 0 |
| D | 30.0 | 25.5 | 21.8 | 13.2 | 9.3 | 0.2 | 0 | 0 |
| E | 30.0 | 10.0 | 30.0 | 20.0 | 10.0 | 0 | 0 | 0 |
| F | 16.4 | 27.8 | 21.2 | 15.1 | 4.7 | 6.4 | 0 | 8.5 |
| G | 32.8 | 0 | 20.8 | 17.0 | 0 | 12.5 | 0 | 17.1 |
| H | 48.5 | 8.4 | 4.3 | 23.4 | 0 | 5.4 | 0 | 10.0 |

TABLE 2

Properties of glasses in Table 1

| Glass | Glass Transition Temperature, ° C. | Coefficient of thermal expansion ($\times 10^{-7}$)/° C. | Molar ratio of $B_2O_3/SiO_2$ | Total mole % $B_2O_3 + SiO_2$ |
|---|---|---|---|---|
| A | 556 | 44 | 1.7 | 40.9 |
| B | 560 | 48 | 1.6 | 34.9 |
| C | 515 | 102.4 | 1.5 | 50.0 |
| D | 529 | 103.1 | 1.7 | 35.0 |
| E | 592 | 85 | 1.5 | 50.0 |
| F | 525 | 66 | 1.4 | 36.3 |
| G | 550 | 90 | 1.2 | 37.8 |
| H | 581 | 102.8 | 0.2 | 27.7 |

It will be appreciated that an ink made in accordance with the present invention may also be used to form conductive pathways on various electronic devices. Thus, use of the present ink is not intended to be limited to capacitor devices alone.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

What is claimed is:

1. A capacitor comprising a copper termination, said copper termination made by firing a lead-free and cadmium-free ink including a glass component, said glass component comprising:
   a. up to about 65 mole % ZnO;
   b. about 0.1 to about 61 mole % $B_2O_3$;
   c. about 0.1 to about 63 mole % $SiO_2$; and
   d. wherein the ratio of $B_2O_3$ to $SiO_2$ is from about 0.7 to about 5.

2. The capacitor of claim 1 wherein the glass component comprises:
   a. up to about 51 mole % SrO;
   b. up to about 17 mole % $Al_2O_3$;
   c. up to about 40 mole % BaO+CaO; and
   d. up to about 20 mole % MgO.

3. The capacitor of claim 2 wherein the molar ratio of $B_2O_3$ to $SiO_2$ in the glass component is about 0.7 to about 3.

4. The capacitor of claim 2 wherein the glass component comprises about 5 to about 60 mole % $B_2O_3+SiO_2$.

5. The capacitor of claim 4 wherein the glass component excludes alkali oxides.

6. The capacitor of claim 1 wherein the glass component comprises:
   a. about 20 to about 60 mole % ZnO,
   b. up to about 49 mole % SrO,
   c. about 0.1 to about 61 mole % $B_2O_3$,
   d. about 0.1 to about 17 mole % $Al_2O_3$,
   e. about 0.1 to about 63 mole % $SiO_2$,
   f. up to about 40 mole % BaO+CaO,

TABLE 3

Compositional analysis of inventive inks and optimum firing range

| Ink | Glass used (Table 1) | Cu I | Cu II | Cu III | Glass amount | Acrylic resin | Surfactant | Terpineol prime 318 | Optimum firing range, ° C. |
|---|---|---|---|---|---|---|---|---|---|
| | | | | | Weight % | | | | |
| AA | A | 29.9 | 20.5 | 18.7 | 6.5 | 4.5 | 0.8 | 19.1 | 810–820 |
| AB | B | 29.9 | 20.5 | 18.7 | 6.5 | 4.5 | 0.8 | 19.1 | 810–820 |
| AC | C | 29.9 | 20.5 | 18.7 | 6.5 | 4.5 | 0.8 | 19.1 | 800–810 |
| AD | D | 39.6 | 29.5 | 0 | 6.5 | 4.5 | 0.8 | 19.1 | 790–820 |
| AE | E | 39.6 | 29.5 | 0 | 6.5 | 4.5 | 0.8 | 19.1 | 800–810 |
| AF | F | 39.6 | 29.5 | 0 | 6.5 | 4.5 | 0.8 | 19.1 | 800–825 |
| AG | G | 29.9 | 20.5 | 18.7 | 6.5 | 4.5 | 0.8 | 19.1 | 800–810 |
| AH | H | 29.9 | 20.5 | 18.7 | 6.5 | 4.5 | 0.8 | 19.1 | 800–810 | g. up to about 20 mole % MgO, h. wherein the ratio of $B_2O_3$ to $SiO_2$ is from about 0.7 to about 3.

7. The capacitor of claim 6 wherein the glass component comprises about 5 to about 60 mole % $B_2O_3+SiO_2$.

8. The capacitor of claim 6 wherein the glass component comprises about 25 to about 35 mole % BaO+CaO.

9. The capacitor of claim 6 wherein the glass component comprises about 5 to about 15 mole % MgO.

10. The capacitor of claim 6, wherein the glass component further comprises about 0.1 to about 30 mole % CuO.

11. The capacitor of claim 8 further comprising 2–15 mole % $Li_2O+Na_2O+K_2O+Rb_2O+Cs_2O+Fr_2O$.

12. The capacitor of claim 1 wherein the glass component comprises:
  a. about 0.1 to about 65 mole % ZnO,
  b. about 0.1 to about 51 mole % SrO,
  c. about 0.1 to about 61 mole % $B_2O_3$,
  d. about 0.1 to about 17 mole % $Al_2O_3$,
  e. about 0.1 to about 63 mole % $SiO_2$,
  f. about 0.1 to about 40 mole % BaO+CaO,
  g. about 0.1 to about 20 mole % MgO.

13. The capacitor of claim 1 wherein the glass component comprises:
  a. about 10 to about 56 mole % ZnO,
  b. about 0.1 to about 49 mole % SrO,
  c. about 15 to about 35 mole % $B_2O_3$,
  d. about 0.1 to about 17 mole % $Al_2O_3$,
  e. about 1 to about 35 mole % $SiO_2$,
  f. about 0.1 to about 35 mole % BaO+CaO,
  g. about 0.1 to about 15 mol % MgO,
  h. wherein the ratio of $B_2O_3$ to $SiO_2$ is from about 0.8 to about 4
  i. wherein the ink has a viscosity of about 20,000 to about 30,000 centipoise.

14. The capacitor of claim 1 wherein the glass component comprises:
  a. about 40 to about 60 mole % ZnO,
  b. 0 mole % SrO,
  c. about 20 to about 30 mole % $B_2O_3$,
  d. about 0.2 to about 15 mole % $Al_2O_3$,
  e. about 10 to about 25 mole % $SiO_2$,
  f. about 1 to about 15 mole % MgO,
  g. wherein the glass component excludes alkali oxides,
  h. wherein the molar ratio of $B_2O_3$ to $SiO_2$ is from about 1.0 to about 1.8,
  i. wherein the ink has a viscosity of about 15,000 to about 35,000 centipoise.

15. A lead-free and cadmium-free ink for forming a conductive copper pathway, said ink including a glass component and a metal component, said glass component comprising:
  a. up to about 65 mole % ZnO,
  b. about 0.1 to about 61 mole % $B_2O_3$,
  c. about 0.1 to about 63 mole % $SiO_2$,
  d. wherein the molar ratio of $B_2O_3$ to $SiO_2$ is about 0.7 to about 5
  e. wherein the ink has a viscosity of about 15,000 to about 35,000 centipoise, and
  f. wherein said ink comprises by weight from about 1 to about 22 percent by weight of said glass component.

16. The ink of claim 15, wherein the glass component further comprises:
  a. about 0.1 to about 20 mole % MgO, and the molar ratio of $B_2O_3$ to $SiO_2$ is about 0.7 to about 4, and
  b. said ink comprises from about 55 to about 85 percent by weight of said metal component.

17. The ink of claim 15, wherein the glass component further comprises BaO and CaO, wherein the total of BaO+CaO is about 0.1 to about 40 mole %.

18. The ink of claim 15, wherein the glass component further comprises:
  a. about 0.1 to about 51 mole % SrO,
  b. about 0.1 to about 17 mole % $Al_2O_3$.

19. The ink of claim 18, wherein the glass component further comprises:
  a. about 1 to about 17 mole % $Al_2O_3$,
  b. about 0.1 to about 20 mole % CuO.

20. The capacitor of claim 18 wherein the glass component comprises:
  a. about 45 to about 65 mole % ZnO,
  b. about 10 to about 35 mole % $B_2O_3$,
  c. about 1 to about 20 mole % $SiO_2$,
  d. about 0.1 to about 20 mole % MgO,
  e. about 0.1 to about 5 mole % $Al_2O_3$,
  f. wherein the molar ratio of $B_2O_3$ to $SiO_2$ is about 0.7 to about 2.5.

21. The ink of claim 15 wherein said glass component further comprises:
  a. about 0.1 to about 20 mole % $CO_3O_4+MnO_2$, and
  b. about 0.1 to about 17 mole % $La_2O_3+Y_2O_3+Ga_2O_3$.

22. A process for making a multilayer ceramic chip capacitor having end terminations comprising:
  a. forming a green chip by stacking alternating layers of a dielectric material and a conductive electrode material,
  b. firing the green chip to form a multilayer ceramic chip capacitor body,
  c. applying a conductive lead-free and cadmium-free ink to the ceramic chip capacitor body, said ink comprising a glass component, said glass component comprising:
    i. up to about 65 mole % ZnO,
    ii. about 0.1 to about 61 mole % $B_2O_3$,
    iii. about 0.1 to about 63 mole % $SiO_2$,
    iv. wherein the ratio of $B_2O_3$ to $SiO_2$ is from about 0.7 to about 5, and
    v. wherein the ink has a viscosity of about 15,000 to about 35,000 centipoise; and,
  d. post-firing the chip and forming the conductive end terminations.

* * * * *